US007200256B2

(12) United States Patent
Rose et al.

(10) Patent No.: US 7,200,256 B2
(45) Date of Patent: Apr. 3, 2007

(54) PIN PROTRUSION MEASUREMENT PROBE

(75) Inventors: Donald Rose, Derby, KS (US); William Andreas, Derby, KS (US)

(73) Assignee: The Boeing Company, Chicago, IL (US)

( * ) Notice: Subject to any disclaimer, the term of this patent is extended or adjusted under 35 U.S.C. 154(b) by 791 days.

(21) Appl. No.: 10/462,863

(22) Filed: Jun. 16, 2003

(65) Prior Publication Data

US 2004/0252877 A1 Dec. 16, 2004

(51) Int. Cl.
*G06K 9/00* (2006.01)

(52) U.S. Cl. .................................................. 382/141

(58) Field of Classification Search ................ 382/141, 382/151, 152; 348/86, 96; 33/501, 504
See application file for complete search history.

(56) References Cited

U.S. PATENT DOCUMENTS

| | | | | |
|---|---|---|---|---|
| 4,167,066 A | * | 9/1979 | Cooper et al. ................ 33/504 |
| 4,828,159 A | * | 5/1989 | Woods ........................ 227/156 |
| 5,189,808 A | | 3/1993 | Evans et al. .................. 33/836 |

OTHER PUBLICATIONS

"Installation tooling pin protrusion gauges", Catalog pp. 8029-8030, Hi Shear Corporation, Torrance, CA, USA.
USATCO On-line, Hi-sheer accessories, http://www.usatco.com/hi_shear_accessories_01.asp, (Apr. 7, 2003) USATCO U.S. Air Tool Company, Inc., USA.
Firing Pin Protrusion Gauge, http://www.bushmaster.com/shopping/gunsmith/mmt-0005.asp, (Apr. 7, 2003) Bushmaster, Inc., USA.

* cited by examiner

*Primary Examiner*—Daniel Mariam
(74) *Attorney, Agent, or Firm*—Ingrassia Fisher & Lorenz, P.C.

(57) ABSTRACT

A system for pin protrusion measurement of a fastener includes a pin protrusion measurement probe having an electronic camera and a probe socket. The probe socket fits over a nut of the fastener and establishes a fixed, stable position of the pin protrusion measurement probe relative to the fastener. Light from the fastener passes through a viewing window in the probe socket, is reflected through a right angle prism, focused by a lens, and forms an image of the fastener in the electronic camera. A real-time monitor display allows an operator to view the image. A computer, connected to the electronic camera, and having a vision system, processes the image of the fastener, and provides the pin protrusion measurement.

31 Claims, 6 Drawing Sheets

PIN PROTRUSION MEASUREMENT PROBE

BACKGROUND OF THE INVENTION

The present invention generally relates to mechanical fastening and, more particularly, to measurement of the pin protrusion from the bearing surface of the nut to the end of the bolt for a fastening using a nut and bolt.

In the assembly line manufacture of commercial aircraft, nut and bolt fasteners that fasten various components of the airframe and aircraft structure may require the nuts to be fastened in relatively inaccessible locations or confined spaces, such as the aft side of the aft pressure bulkhead in the tail cone area of the aircraft fuselage. FIG. 1 shows a typical fastener 100 including a bolt 102 or pin 102, nut 104, and washer 106 combination. Bolts 102 may be provided with various lengths—called the grip length of the bolt (not shown)—depending on the thickness of structure which is to be held together by the nut-bolt combination and through which the bolt may pass. Different bolts may have a fixed thread length for various grip lengths. In other words, a long bolt, such as pin 102 shown in FIG. 1, may have threads cut for a certain length, the thread length 108, along the bolt from the end of the bolt, and the thread length 108 may be the same for a longer bolt and for a shorter bolt. Because the fasteners may have a fixed thread length 108 for various grip lengths, fasteners are required to conform to specifications regarding the height that the bolt is allowed to protrude, referred to as "pin protrusion".

More specifically, a maximum pin protrusion 110 may be the specified maximum height that pin 102 may protrude above the bearing surface 112 of nut 104. Maximum pin protrusion 110 may also be measured from the bearing surface 114 of washer 106, which is in contact with bearing surface 112 of nut 104. If the maximum pin protrusion 110 is exceeded, nut 104 could engage the last thread of the pin 102 before the required compression of the joint being fastened occurs. Nut 104 engaging the last thread of thread length 108 on the bolt 102 may also be described as the nut 104 "bottoming out" on the threads of bolt 102. A nut 104 that bottoms out may result in a false torque reading when tightening nut 104, and inadequate fastening of fastener 100. Conforming to the maximum pin protrusion 110 specification may ensure, for example, that all of the threads of nut 104 that are engaged with threads of pin 102 are engaged so as to be load bearing, and may ensure proper tightening of nut 104 and pin 102 of fastener 100.

A minimum pin protrusion 116 may be the specified minimum height that pin 102 may protrude above the surface 118 of aircraft structural component 120. Minimum pin protrusion 116 may also be referred to in the art as "minimum pin protrusion to avoid threads in bearing." A minimum thread protrusion 122 may be the specified minimum height that pin 102 may protrude above nut 104. Conforming to the minimum thread protrusion 122 specification may ensure, for example, that an adequate number of threads of pin 102 and nut 104 are engaged in order for fastener 100 to bear the required load. Conversely, a minimum thread protrusion 122 or minimum pin protrusion 116 that is less than the specification may cause fastener 100 to fail.

Pin protrusions, particularly maximum pin protrusion 110, are commonly measured in the prior art using a hand-held gage which may be formed from a rectangular card with a notch cut out so that the gage resembles an L-shaped card. One leg of the L may be placed over the end 124 of pin 102 and the end of the other leg of the L may be aligned with bearing surface 114 of washer 106 in order to achieve a "fit". The alignment of the gage with bearing surface 114 may be performed via mechanical contact of the gage with the bearing surface 114, if washer 106 projects sufficiently far from underneath nut 104 or, if not, the alignment may be performed visually by the user of the gage. Such a prior art hand-held gage is typically one of a set of gages of graduated sizes. If a gage that is larger than the maximum pin protrusion 110 specified, or one that is smaller than, for example, the minimum pin protrusion 116 or minimum thread protrusion 122 specified, can be made to "fit" as described, the fastener 100 is deemed not to conform to the specification. Otherwise, if the fastener 100 has, for example, maximum pin protrusion 110 that is within specification as indicated by the gages, the fastener 100 is deemed to conform to the specification. Thus, the prior art gages may indicate whether or not a fastener is within specifications, i.e., a Go-No Go indication, but, in general, do not provide a direct quantitative measurement of the actual dimension of fastener 100 that corresponds to, for example, the maximum pin protrusion 110 dimension that is indicated on FIG. 1. Thus, the prior art gages have one shortcoming that they cannot be used to provide useful statistical analyses for quality control.

Pin protrusions may also be measured in the prior art using a depth micrometer. It has been found, however, that because of the limited access to confined spaces, such as in the tail cone of a commercial aircraft, that a depth micrometer cannot be used for making the required pin protrusion measurements.

In confined spaces and relatively inaccessible locations often encountered in the manufacture of aircraft, a user of the prior art hand-held gages may have difficulty using the gage in the confined space in a manner in which the gage is designed to be used. The confined space or relatively inaccessible location may not provide an adequate view of the gage for visual alignment, or the view may be blocked by the user's hand holding the gage, so that the gage may have to be used "by feel." Such use by feel is usually less accurate than visual verification of the gage fit, and may not be possible if, for example, washer 106 does not project sufficiently far from underneath nut 104 to provide a mechanical alignment of the gage.

As can be seen, there is a need for a tool for measurement of pin protrusion of fastenings, such as nut and bolt fastenings used on aircraft. Also there is a need for accurate visual measurement of pin protrusion for nut and bolt fastenings located in confined spaces and relatively inaccessible locations—such as the tail cones of commercial jet liners. Moreover, there is a need for accurate quantitative measurements of pin protrusion of nut and bolt fastenings that may be used to perform statistical analyses and improve quality control for aircraft manufacture.

SUMMARY OF THE INVENTION

In one aspect of the present invention, a system for pin protrusion measurement of a fastener includes a pin protrusion measurement probe having an electronic camera and a probe socket. The probe socket fits over the fastener and establishes a fixed position of the pin protrusion measurement probe relative to the fastener. Light from the fastener forms an image of the fastener in the electronic camera. A computer, connected to the electronic camera, processes the image of the fastener, and provides the pin protrusion measurement.

In another aspect of the present invention, a measurement tool for measuring a pin protrusion of a fastener includes a pin protrusion measurement probe. The probe has a probe socket, that fits over a nut of the fastener and establishes a stable position of the pin protrusion measurement probe relative to a bearing surface of the nut of the fastener when fitted over the nut. The probe has an electronic camera and light from the fastener forms an image of the fastener in the electronic camera. The probe also has at least one electro-luminescent lighting panel, disposed near the probe socket, that provides illumination of the fastener. A regulator module is connected to the electro-luminescent lighting panels through a wiring harness, and the electro-luminescent lighting panels are individually adjustable from the regulator module. The tool includes a computer, connected to the electronic camera, having vision system software that processes the image of the fastener, and measures the pin protrusion of the fastener.

In still another aspect of the present invention, a pin protrusion measurement probe for measuring a pin protrusion of a fastener includes a pin protrusion measurement probe housing having a longitudinal axis and a socket housing with a parallel offset from the longitudinal axis. The pin protrusion measurement probe housing also includes a probe socket attached to the pin protrusion measurement probe housing in the socket housing. The probe socket fits over a nut of the fastener; the probe socket establishes a stable position of the pin protrusion measurement probe housing relative to a bearing surface of the nut of the fastener when the socket is fitted over the nut; and the probe socket includes a viewing window. The pin protrusion measurement probe housing also includes an electro-luminescent lighting panel, held by the pin protrusion measurement probe housing in the socket housing. The pin protrusion measurement probe housing also includes an electronic camera, held by the pin protrusion measurement probe housing. Light from the fastener passes through the viewing window and forms an image of the fastener in the electronic camera.

In yet another aspect of the present invention, a system for making a pin protrusion measurement of a fastener in a confined space within an aircraft is disclosed. The system includes a pin protrusion measurement probe. The pin protrusion measurement probe includes a pin protrusion measurement probe housing having a longitudinal axis and a socket housing with a parallel offset and an angled offset from the longitudinal axis. The pin protrusion measurement probe includes a probe socket attached to the pin protrusion measurement probe housing in the socket housing. The probe socket fits over a nut of the fastener; the probe socket establishes a stable position of the pin protrusion measurement probe housing relative to a bearing surface of the nut of the fastener when the socket is fitted over the nut; and the probe socket includes a viewing window. The pin protrusion measurement probe includes a first electro-luminescent lighting panel, held by the pin protrusion measurement probe housing in the socket housing, and the first electro-luminescent lighting panel has a first adjustable lighting intensity. The pin protrusion measurement probe includes a second electro-luminescent lighting panel, held by the pin protrusion measurement probe housing in the socket housing, and the second electro-luminescent lighting panel has a second adjustable lighting intensity. The first adjustable lighting intensity and second adjustable lighting intensity are individually adjustable to control a lighting of the fastener. The pin protrusion measurement probe includes a right angle optical prism that is held by the pin protrusion measurement probe housing. Light from the fastener passes through the viewing window and is reflected through the prism. The pin protrusion measurement probe includes a lens that is held by the pin protrusion measurement probe housing. The lens is pointed toward the prism, and the lens focuses light from the prism. The pin protrusion measurement probe also includes an electronic camera, held by the pin protrusion measurement probe housing. Light from the fastener passes through the viewing window, is reflected by the prism, is focused by the lens, and forms an image of the fastener in the electronic camera.

The system also includes a real-time display monitor connected by a signal connector cable to a signal output of the electronic camera, the real-time display monitor displaying the image of the fastener. The system also includes a computer, connected to the electronic camera, having vision system software that processes the image of the fastener, wherein the vision system software performs an edge search of the image of the fastener, locates a first edge position, locates a second edge position, and measures a pin protrusion of the fastener corresponding to a distance between the first edge position and the second edge position to make the pin protrusion measurement.

In a further aspect of the present invention, a method for measuring pin protrusion of a fastener includes steps of: providing a pin protrusion measurement probe having an electronic camera and a socket; connecting the pin protrusion measurement probe to a computer having a vision system; placing the pin protrusion measurement probe at a stable position relative to the fastener; and measuring the pin protrusion of the fastener using the computer vision system.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides a tool for measurement of pin protrusion for fastenings using a nut and bolt, such as nut and bolt fastenings used on aircraft and, in particular, nut and bolt fastenings located in confined spaces and relatively inaccessible locations—such as the tail cone of a commercial jet liner. One embodiment may satisfy a need that has gone unmet by other gauge measurement producers, that is to provide a tool that could be used comfortably and accurately in confined spaces. One embodiment may provide accurate visual pin protrusion measurement in confined spaces, by way of contrast to prior art tools, which either cannot fit into the confined space to properly engage a nut and bolt or cannot be used as intended to make an accurate measurement due, for example, to restrictions on viewing the tool imposed by the confined space. Quantitative results provided by one embodiment may be used to perform statistical analyses, improving quality control for example, by way of contrast to prior art tools that provide only an Go-No Go indication, i.e., whether or not the pin protrusion is within specifications, for a fastening and that do not provide enough data for useful statistical analyses. In one embodiment, a system for pin protrusion measurement may be integrated with other automated manufacturing tools, by way of contrast to simple prior art tools that have no interface to an electronic system.

Figure 2:
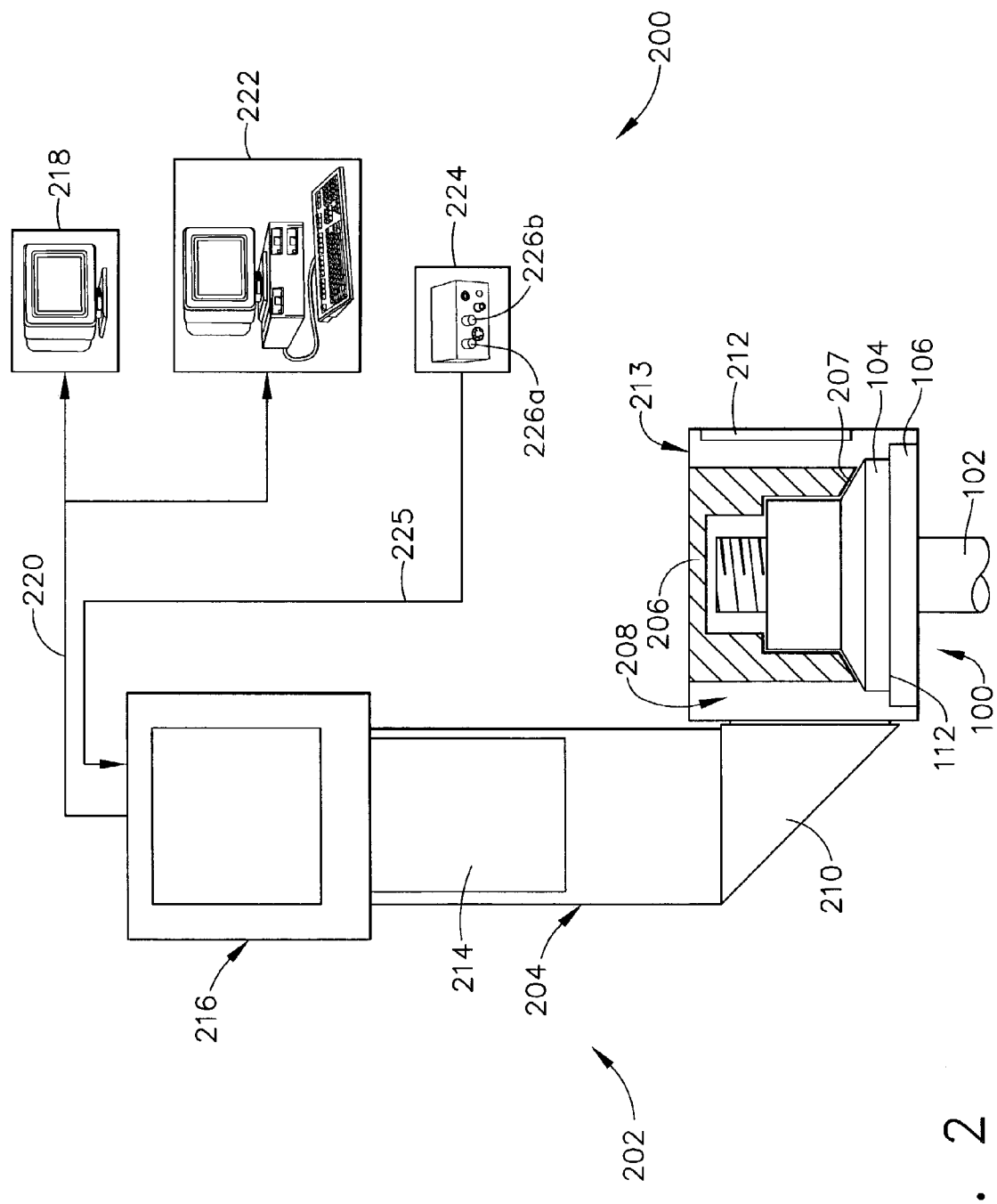
FIG. 2 is a high-level component integration plan illustrating a pin protrusion measurement system according to one embodiment of the present invention.

Referring now to FIG. 2, a pin protrusion measurement system 200 is illustrated according to one embodiment. Pin protrusion measurement system 200 may include a pin protrusion measurement probe 202. Pin protrusion measurement probe 202 may include a pin protrusion measurement probe housing 204 that may physically support and hold in a fixed position relative to each other a number of physical components of system 200. Pin protrusion measurement probe housing 204 may hold a probe socket 206, which may attached to probe housing 204. The probe socket 206 may be sized to fit over a nut 104 and pin 102 so that socket 206 may fix the position of pin protrusion measurement probe housing 204, and thereby establish the position 207 of pin protrusion measurement probe 202, in a fixed, i.e., stable, spatial relationship to fastener 100 and, in particular, to bearing surface 112 of nut 104 of fastener 100 so that a precise measurement of pin protrusions—for example, maximum pin protrusion 110, minimum pin protrusion 116, and minimum thread protrusion 122—can be made optically. Socket 206 may include a viewing window 208. Viewing window 208 may allow viewing of pin 102, nut 104, and washer 106 of fastener 100 from the direction of right angle prism 210. Viewing window 208 may also allow for direct viewing by the probe's user of pin 102, nut 104, and washer 106 from the side of probe 202, for example, from a direction perpendicular to the page in FIG. 2.

Pin protrusion measurement system 200 may include—and pin protrusion measurement probe housing 204 may hold—a right angle optical prism 210, electro-luminescent (EL) panels 212, a lens 214, and an electronic camera 216. The electronic camera 216 may be, for example, a small, board-level, charge coupled device (CCD) camera. A lens 214, which may include a system of one or more lenses, may be attached to camera 216, housing 204, or both, in line with camera 216 and pointed toward right angle optical prism 210. Lens 214, for example, may have a focal length of 16 millimeters (mm) and right angle optical prism 210 may have a size, for example, of 20 mm. Lens 214 may be adjusted to focus on the CCD device of camera 216 so that light from pin 102, nut 104, and washer 106 is reflected by right angle optical prism 210 into lens 214, is focused, and forms an image of fastener 100 on the CCD device of camera 216. A prism 210 may be used instead of a mirror to reflect light from the fastener 100 to camera 216 in order to minimize optical distortion.

Electro-luminescent panels 212 may be provided within and held by socket housing 213, which may be an integral part of probe housing 204, in order to provide consistent, even illumination of fastener 100 for forming the image of fastener 100 in camera 216. In order to provide suitable measurements, each picture, i.e., image of fastener 100, requires the same amount of source light as every other picture. Although, for clarity, FIG. 2 shows only one EL panel 212 attached in socket housing 213, it may be desirable to provide at least two EL panels 212 in socket housing 213. EL lighting intensity may be controlled by individually adjusting the voltage supplied to each of the EL panels 212. By individually adjusting the EL lighting intensity of each EL panel 212, forward and back lighting may be controlled in order to achieve consistent lighting characteristics, such as contrast and brightness, from picture to picture so that precise, repeatable pin protrusion measurements may be made.

Pin protrusion measurement system 200 may include a real-time display monitor 218 connected to an electronic output of camera 216 for displaying the image of fastener 100 concurrently as the image is formed in camera 216, i.e. in real time. For example, a cathode ray tube (CRT) or liquid crystal diode (LCD) flat panel display may be connected by a signal connector cable 220 to a signal output of CCD device of camera 216. Real-time display of the image of fastener 100 on CCD device of camera 216 may be used by the operator of system 200 to ascertain that probe socket 206 of measurement probe 202 is placed correctly over nut 104.

Pin protrusion measurement system 200 may include a computer 222 that operates frame grabber and vision software to provide display and measurement functions, as further described below. Computer 222 may be connected to camera 216 by a signal connector cable 220.

Pin protrusion measurement system 200 may also include a regulator module 224, that may be connected to probe 202 by wiring harness 225, and that may supply regulated voltages to EL panels 212 and, for example, to the CCD device and circuitry of camera 216. Regulator module 224 may include front panel controls 226 for adjusting the lighting intensity produced by EL panels 212. For example, control 226a may be a one meg-ohm potentiometer that can be adjusted by hand to control the voltage provided by regulator module 224 to a first EL panel 212, and control 226b may be a second one meg-ohm potentiometer that can be adjusted by hand to control the voltage provided by regulator module 224 to a second EL panel 212 attached to socket housing 213.

Figure 3:
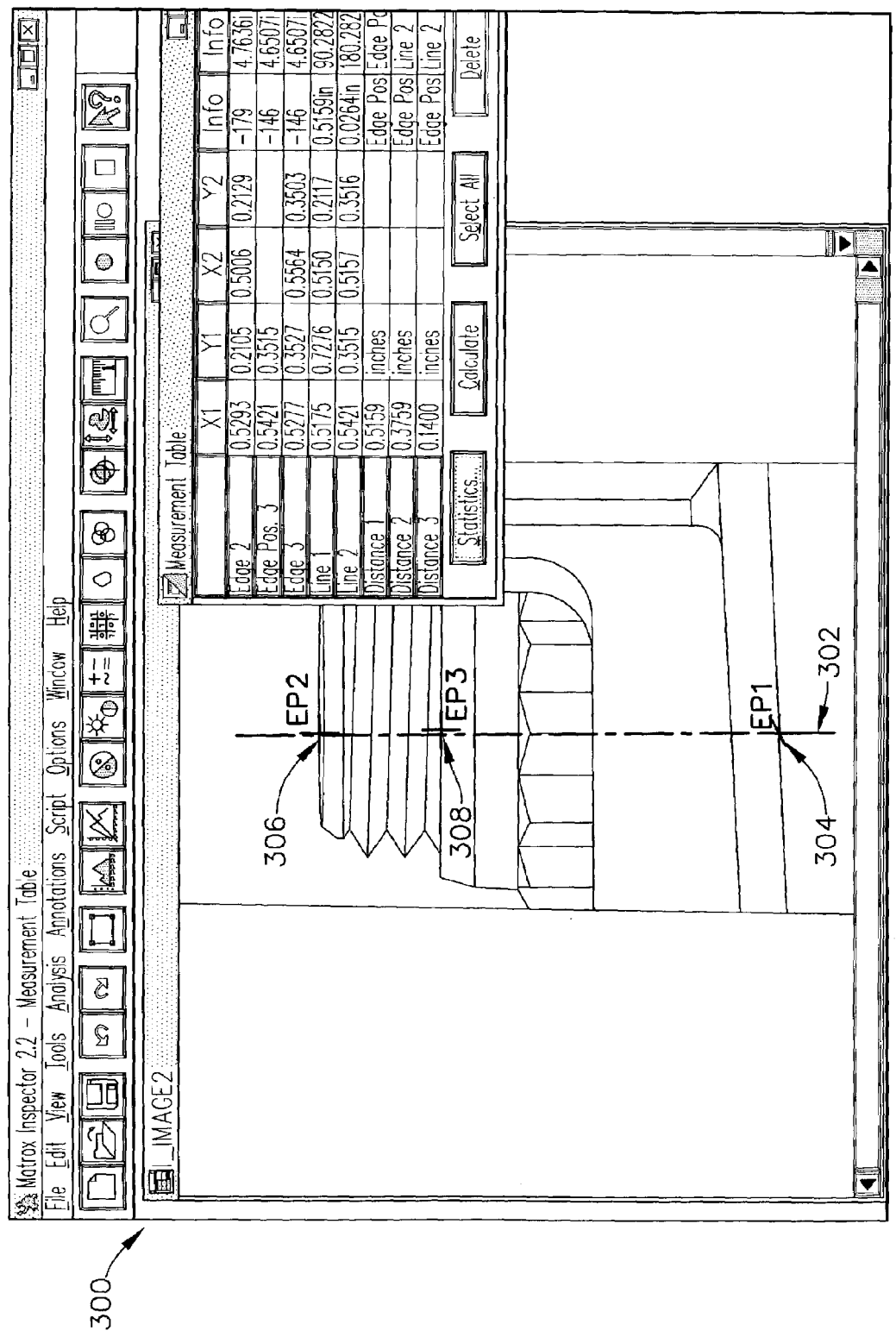
FIG. 3 is an exemplary computer monitor screen display produced by a pin protrusion measurement system in accordance with one embodiment of the present invention.

Referring now to FIG. 3, an exemplary computer monitor screen display 300, such as may be produced by frame grabber and vision software operated by computer 222, for a pin protrusion measurement system 200 is illustrated in accordance with one embodiment. For example, display 300 may be provided using Matrox Inspector® vision system software and a Matrox Meteor-II® frame grabber card installed in computer 222. The frame grabber hardware and supporting software may be used to make a "snapshot", or momentary, image of fastener 100 at a chosen moment in time, i.e., providing a freeze frame of the real-time monitor image. The vision system software may provide image recognition features, such as edge detection, that may enable automatic processing of the captured image of fastener 100 on CCD device of camera 216 to provide the measurements required by the user, for example, maximum pin protrusion 110, minimum pin protrusion 116, and minimum thread protrusion 122. Automatic processing of the measurements may, for example, speed up analysis of the measurements compared to the prior art and remove operator subjectivity—common in the prior art—from the measurements.

A pin protrusion measurement may be made, for example, using the vision software to perform an edge detection search along a path such as path 302 shown on display 300 in FIG. 3. The edge detection search along path 302 may locate a first edge position 304, which may correspond to bearing surface 112 of nut 104. The edge detection search along path 302 may also locate a second edge position 306, which may correspond to end 124 of pin 102. The edge detection search along path 302 may additionally locate a third edge position 308, which may correspond to the top surface of nut 104. Thus, with suitable calibration of the software, for example, to the CCD device of camera 216, the vision system software may be able to provide maximum pin protrusion 110 measurement corresponding to the distance between first edge position 304 and second edge position 306. In addition, the vision system software may be able to provide minimum thread protrusion 122 measurement corresponding to the distance between second edge position 306 and third edge position 308. The measurements may be stored by the vision system software, for example, in a memory in computer 222. The vision system software may be capable of being used with a macro that allows the operator to move the probe 202 from one fastener to the next fastener to be measured, and make a collection of measurements. For example, the macro may operates to refresh display 300 and capture the image of the next fastener, perform the edge detection search, make measurements, and store the measurements of interest in, for example, a log file in computer 222. The log file may be used, for example, to collect measurements of a number of fasteners, and the collected measurements may be provided directly, rather than having to be entered by hand, to a statistical software package for analysis.

Figure 4A:
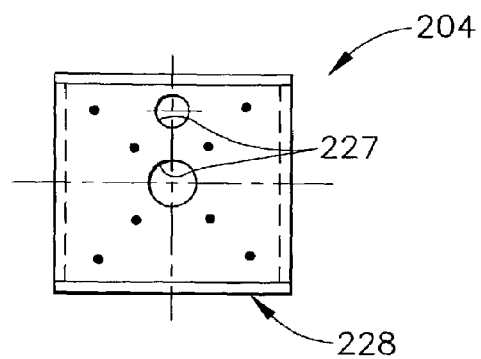
FIG. 4A is an end view of a three-view orthographic drawing of a pin protrusion measurement probe housing, according to one embodiment of the present invention.
Figure 4B:
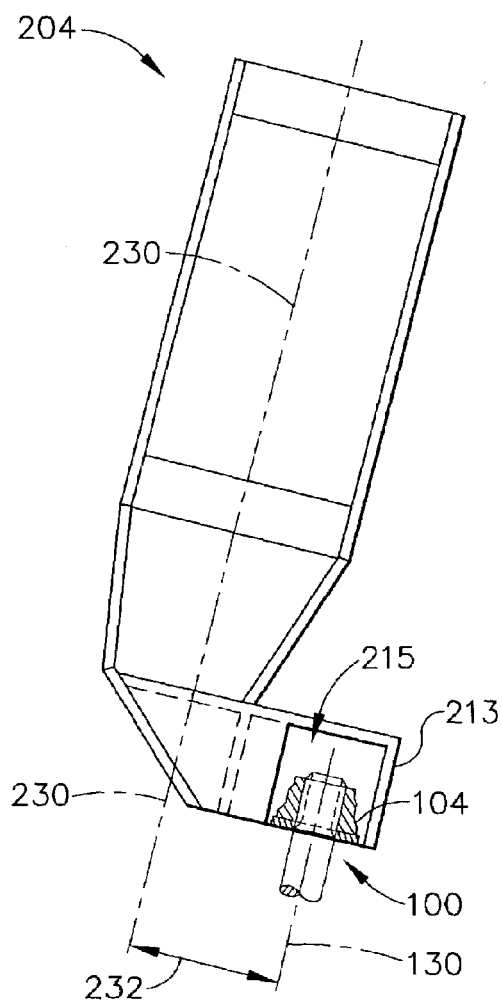
FIG. 4B, is a side view of a three-view orthographic drawing of the pin protrusion measurement probe housing shown in FIG. 4A.
Figure 4C:
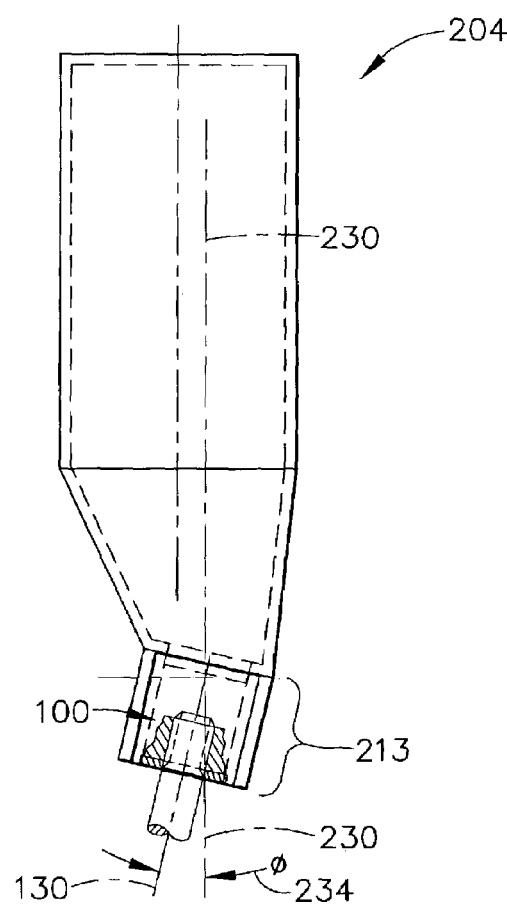
FIG. 4C, is a plan view of a three-view orthographic drawing of the pin protrusion measurement probe housing shown in FIGS. 4A and 4B.

Referring now to FIGS. 4A, 4B, and 4C, a pin protrusion measurement probe housing 204 is illustrated according to one embodiment. As seen in FIGS. 4A, 4B, and 4C, probe housing 204 may provide a hollow structure in which to house components of pin protrusion measurement probe 202, as described above. For example, probe housing 204 may house and provide fixed relative dispositions for probe socket 206, prism 210, EL panels 212, lens 214 and electronic camera 216. FIGS. 4B and 4C also show a fastener 100 in its position relative to probe housing 204 when probe 202 is in use, for clarity in providing an orientation to FIGS. 4A, 4B, and 4C.

As shown in FIG. 4A, probe housing 204 may include holes 227 in housing end 228 to accommodate, for example, connectors that may connect probe 202 to wiring harness 225 and signal connector cable 220. As shown in FIGS. 4B and 4C, probe housing 204 may include a socket housing 213 in which socket 206 may be attached to probe housing 204. Socket housing 213 may include a viewing window 215, which may be used by the operator to aid in correct positioning of probe 202, viewing window 215 of socket housing 213 may be used, for example, in conjunction with viewing window 208 of socket 206 to aid in assuring proper seating of socket 206 on a nut 104 of fastener 100. As seen in FIG. 4B, probe housing 204 and socket housing 213 may be configured to provide a parallel offset 232 of a longitudinal axis 130 of fastener 100 from a longitudinal axis 230 of probe housing 204. As seen in FIG. 4C, probe housing 204 and socket housing 213 may be configured to provide, at the same time, an angled, i.e., non-parallel, offset 234 of the longitudinal axis 130 of fastener 100 from the longitudinal axis 230 of probe housing 204. Longitudinal axis 130 of fastener 100 may also be an axis of socket holder 213 and of probe socket 206, so that parallel offset 232 and angled offset 234 may be referred to as parallel and angled offset, respectively, of socket holder 213 or of probe socket 206.

Figure 5:
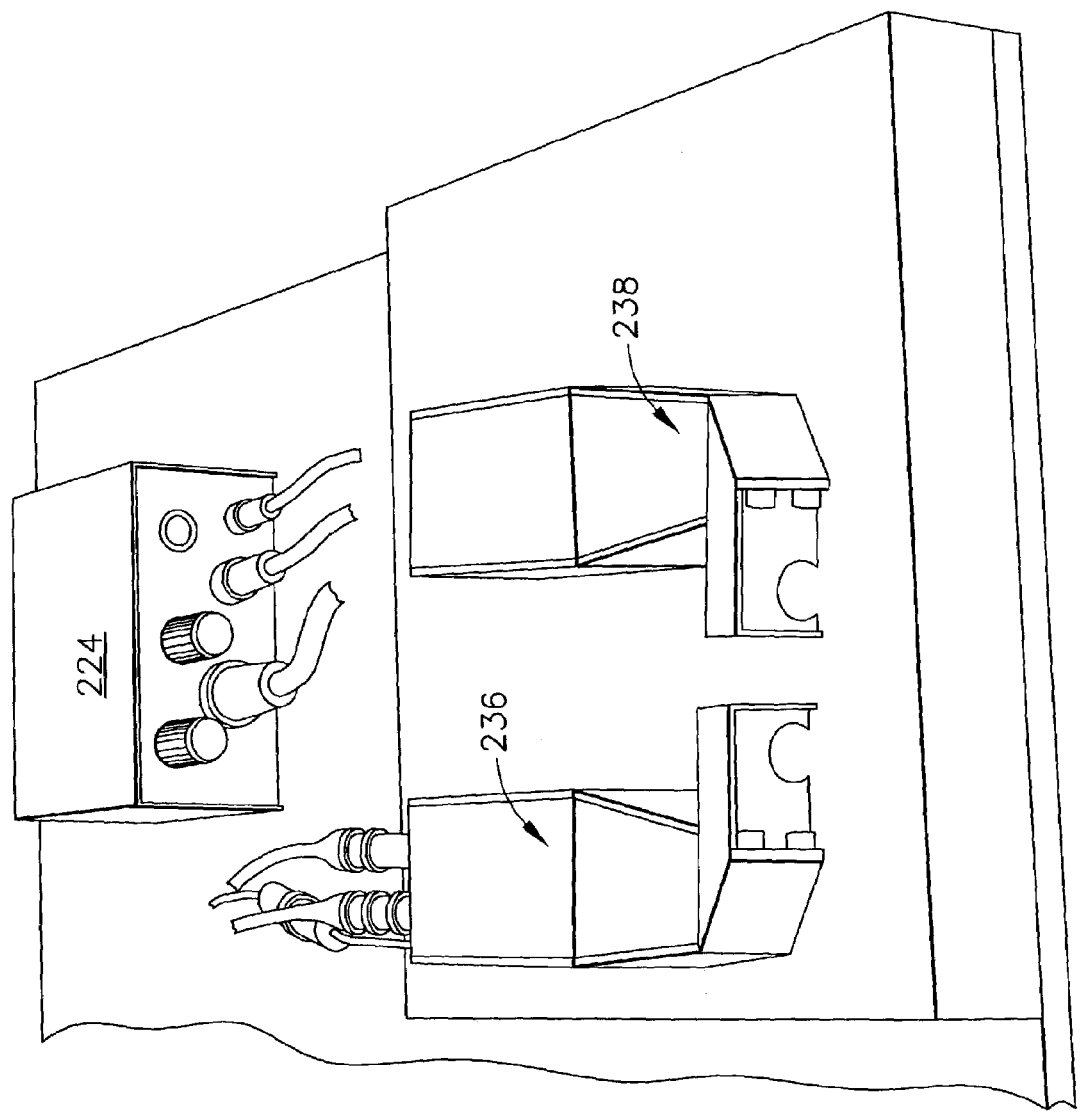
FIG. 5 shows alternative left-hand and right-hand embodiments for the pin protrusion measurement probe housing shown in FIGS. 4A–C.

Due to the asymmetry of probe housing 204 with respect to the parallel offset 232 and angled offset 234, probe housing 204 and, thus, probe 202 may be provided with a right-hand configuration 236 of probe 202 and with an alternative left-hand configuration 238 of probe 202, as shown in FIG. 5. For example, alternative left-hand configuration 238 of probe housing 204 may be provided as a mirror image of right-hand configuration 236 of probe housing 204. The unique form of alternative asymmetrical configurations 236 and 238 may enable the probe 202 to accommodate socket 206, prism 210, lens 214, and camera 216 in optical alignment while allowing the probe 202, i.e., configurations 236 and 238, to fit in a restricted space. For example, in the confined and relatively inaccessible space aft of an aft pressure bulkhead in a commercial aircraft, fasteners may be used on either side of structural members called stringers. The close proximity of fasteners to the stringers and on both sides of the stringers together with the confines of the restricted space may impose conditions that a probe have an angular offset, such as angular offset 234, in order to fit the probe housing 204 into the confined space and over the fastener. Yet, a fastener 100 on one side of a stringer may require, for example, the use of a right-hand configuration—such as right-hand configuration 236—of probe 202 to properly engage and measure fastener 100. At the same time a second fastener 100 on the opposite side of the same stringer may require, for example, the use of a left-hand configuration—such as left-hand configuration 238—of probe 202 to properly engage and measure the second fastener 100.

Figure 1:
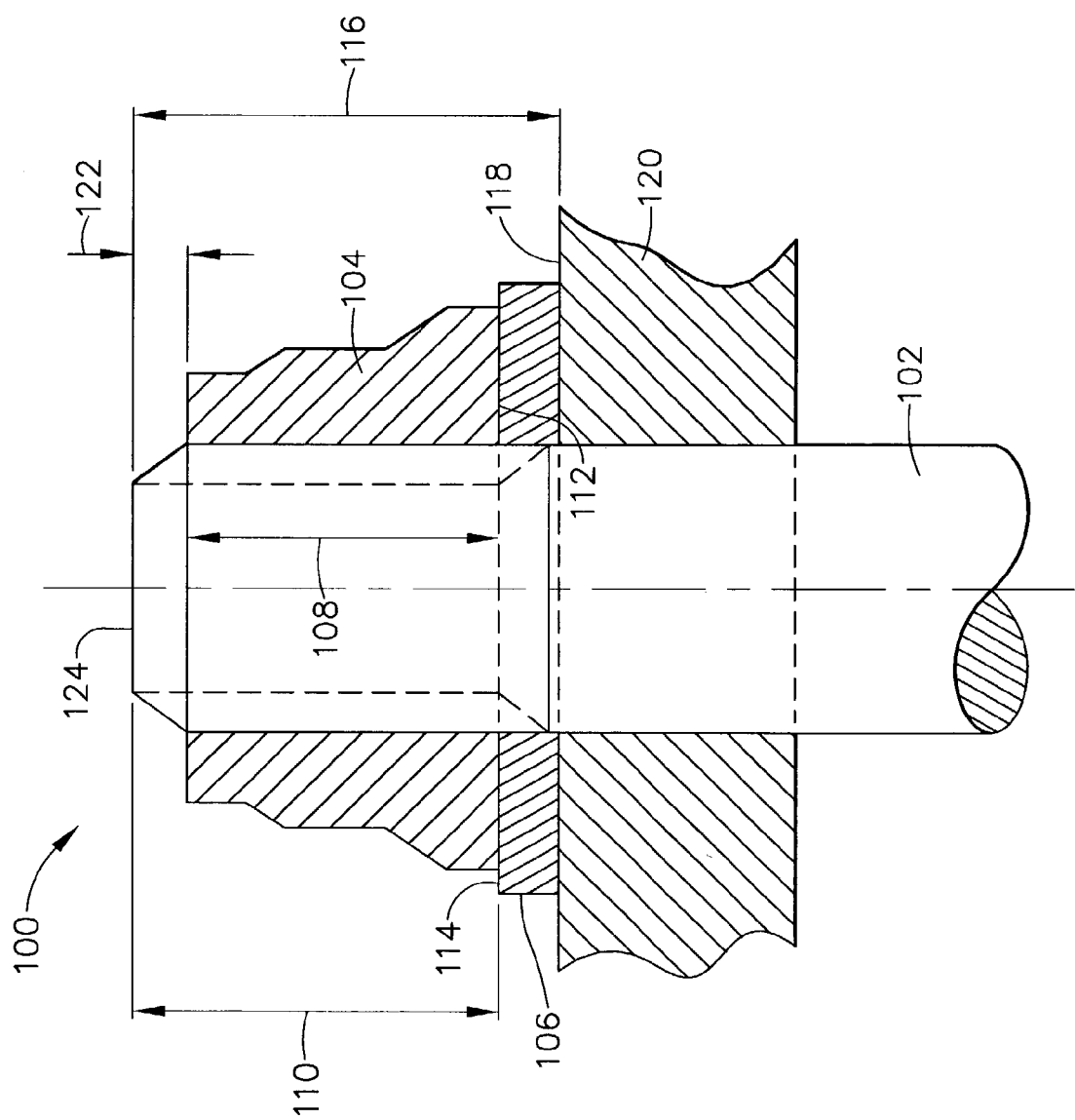
FIG. 1 is a cross-sectional diagram of a prior art nut and bolt fastener illustrating various measurements.
Figure 6:
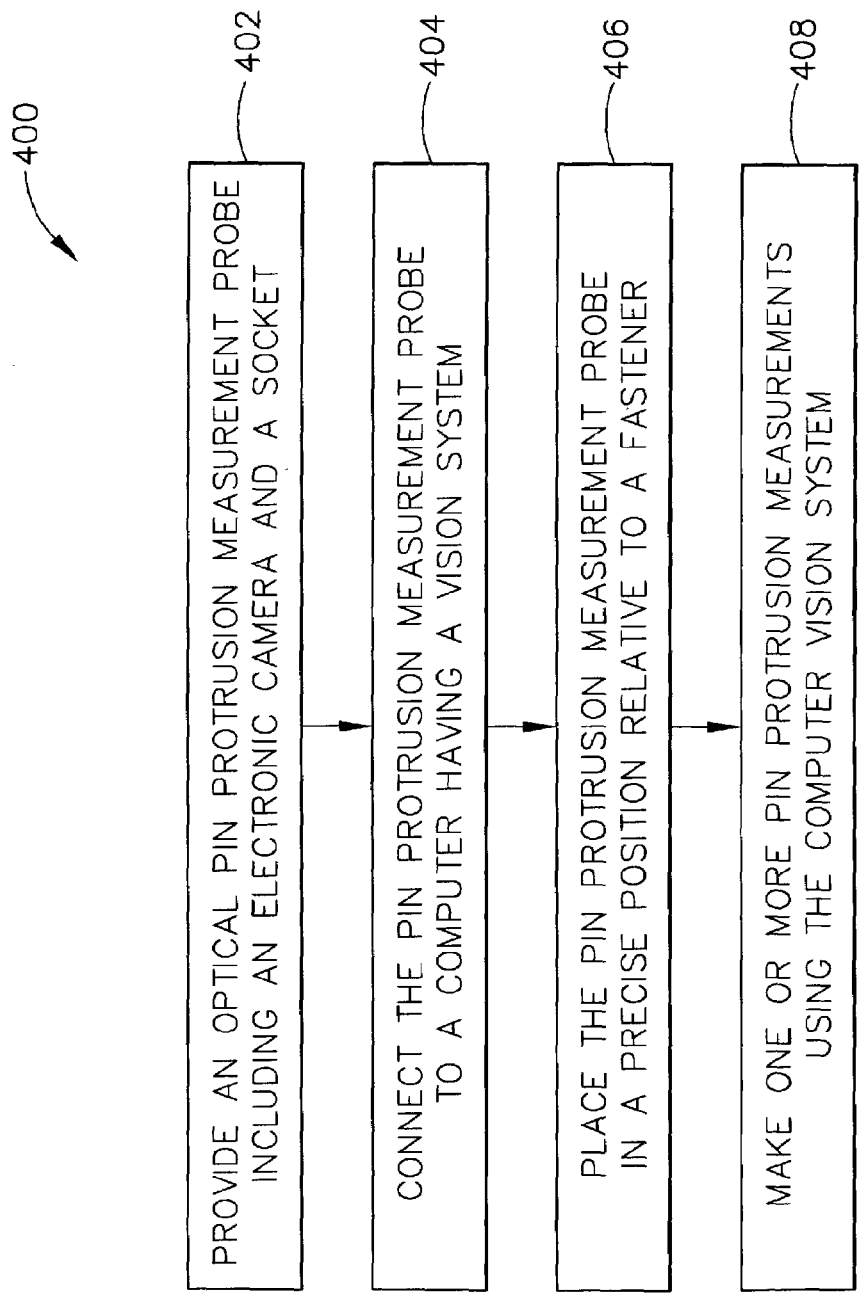
FIG. 6 is a flow chart illustrating a method for measuring pin protrusion, in accordance with an embodiment of the present invention.

Referring now to FIG. 6, an exemplary embodiment of a method 400 for pin protrusion measurement—such as maximum pin protrusion 110, shown in FIG. 1—is illustrated by a flowchart. The exemplary method 400 may include steps 402, 404, 406, and 408, which delineate method 400 for purposes of illustration according to one embodiment. Method 400 is illustrated with reference to FIGS. 1 through 5.

Method 400 may begin with a step 402. At step 402, an optical pin protrusion measurement probe may be provided, which includes an electronic camera and a means for establishing a precise spatial reference position to a fastener. For example, a probe 202 may be provided that includes a camera 216 and a socket 206 that establishes the probe 202 precisely at position 207 relative to bearing surface 112 of nut 104 of fastener 100. Probe 202 may also include optics—such as prism 210 and lens 214—and adjustable lighting—such as EL panels 212 controlled from regulator module 224.

Method 400 may continue with a step 404, in which the optical pin protrusion measurement probe may be connected to a computer having a vision system. For example, probe 202 may be connected via a signal connector cable 220 to a computer 222 that may execute vision system software including a frame grabber and edge detection software capable of automatically making and storing the desired measurements—such as maximum pin protrusion 110.

Method 400 may continue with a step 406, in which the optical pin protrusion measurement probe may be placed in proximity to a fastener and the precise spatial reference position to the fastener is established. For example, probe 202 may be placed so that socket 206 fits over nut 104 of fastener 100 and position 207 of probe 202 is established.

Method 400 may continue with a step 408, in which pin protrusion measurements are made using a computer vision system. For example, an image of fastener 100 provided by electronic camera 216 of probe 202 may be processed by a vision system running on computer 222 to provide maximum pin protrusion 110.

It should be understood, of course, that the foregoing relates to preferred embodiments of the invention and that modifications may be made without departing from the spirit and scope of the invention as set forth in the following claims.

We claim:

1. A system for pin protrusion measurement of a fastener, comprising:
   a pin protrusion measurement probe that includes an electronic camera and a probe socket, wherein said probe socket fits over the fastener and establishes a fixed position of said pin protrusion measurement probe relative to the fastener, and wherein light from the fastener forms an image of the fastener in said electronic camera;
   a computer, connected to said electronic camera, that processes said image of the fastener, and provides the pin protrusion measurement.

2. The system of claim 1, further comprising:
   a pin protrusion measurement probe housing that physically supports and holds in a fixed position relative to each other said electronic camera and said probe socket.

3. The system of claim 1, further comprising:
   a lens disposed in line with said electronic camera, said lens focusing said image of the fastener on an electronic detector of said electronic camera.

4. The system of claim 1, further comprising:
   an electro-luminescent lighting panel, disposed near said probe socket, that provides illumination of the fastener.

5. The system of claim 1, further comprising:
   an optical prism that reflects light from the fastener to said electronic camera.

6. The system of claim 1, further comprising:
   a real-time display monitor connected to said electronic camera.

7. The system of claim 1, further comprising:
   a frame grabber hardware and supporting software that provides a momentary image of the fastener;
   a vision system software that performs an edge search of said momentary image and provides the pin protrusion measurement.

8. The system of claim 1, further comprising:
   a regulator module connected to a pair of electro-luminescent lighting panels through a wiring harness, each of said pair of electro-luminescent lighting panels being individually adjustable from said regulator module.

9. The system of claim 1, wherein:
   said pin protrusion measurement probe includes a pin protrusion measurement probe housing that is asymmetrical.

10. The system of claim 1, further comprising:
    a first pin protrusion measurement probe that includes a pin protrusion measurement probe housing that is asymmetrical and has a right-hand configuration;
    a second pin protrusion measurement probe that includes a pin protrusion measurement probe housing that is asymmetrical and has a left-hand configuration.

11. A measurement tool for measuring a pin protrusion of a fastener, comprising:
    a pin protrusion measurement probe including:
       a probe socket, wherein said probe socket fits over a nut of the fastener, and said probe socket establishes a stable position of said pin protrusion measurement probe relative to a bearing surface of the nut of the fastener when fitted over the nut;
       an electronic camera wherein light from the fastener forms an image of the fastener in said electronic camera; and
       at least one electro-luminescent lighting panel disposed near said probe socket, that provides illumination of the fastener;
    a regulator module connected to said at least one electro-luminescent lighting panel through a wiring harness, said at least one electro-luminescent lighting panel being individually adjustable from said regulator module.
    a computer, connected to said electronic camera, having vision system software that processes said image of the fastener, and measures the pin protrusion of the fastener.

12. The measurement tool of claim 11, wherein said pin protrusion measurement probe further includes:
    a pin protrusion measurement probe housing that holds in a fixed position relative to each other said electronic camera, said probe socket, and said at least one electro-luminescent lighting panel.

13. The measurement tool of claim 11, wherein said pin protrusion measurement probe further includes:
    a pin protrusion measurement probe housing; and
    a lens that is held by said pin protrusion measurement probe housing in a fixed position relative to said electronic camera, said probe socket, and said at least one electro-luminescent lighting panel, wherein said lens is disposed in line with said electronic camera, and said lens focuses said image of the fastener on an electronic detector of said electronic camera.

14. The measurement tool of claim 11, wherein said pin protrusion measurement probe further includes:
    a pin protrusion measurement probe housing; and
    an optical prism that is held by said pin protrusion measurement probe housing in a fixed position relative to said electronic camera, said probe socket, and said at least one electro-luminescent lighting panel, that reflects light from the fastener to said electronic camera.

15. The measurement tool of claim 11, further comprising:
    a real-time display monitor connected by a signal connector cable to a signal output of said electronic camera.

16. The measurement tool of claim 11, wherein:
    said vision system software performs an edge search of the image of the fastener, locates a first edge position, locates a second edge position, and measures the pin protrusion of the fastener corresponding to a distance between said first edge position and said second edge position.

17. The measurement tool of claim 11, wherein said pin protrusion measurement probe includes:
    a pin protrusion measurement probe housing that is asymmetrical, providing a parallel offset of a longitudinal axis of the fastener from a longitudinal axis of said pin protrusion measurement probe housing and an angled offset of the longitudinal axis of the fastener from said longitudinal axis of said pin protrusion measurement probe housing.

18. A pin protrusion measurement probe for measuring a pin protrusion of a fastener, comprising:
   a pin protrusion measurement probe housing having a longitudinal axis and a socket housing with a parallel offset from said longitudinal axis;
   a probe socket attached to said pin protrusion measurement probe housing in said socket housing wherein said probe socket fits over a nut of the fastener, said probe socket establishes a stable position of said pin protrusion measurement probe housing relative to a bearing surface of the nut of the fastener when said socket is fitted over the nut, and said probe socket includes a viewing window;
   a first electro-luminescent lighting panel, held by said pin protrusion measurement probe housing in said socket housing; and
   an electronic camera, held by said pin protrusion measurement probe housing, wherein light from the fastener passes through said viewing window and forms an image of the fastener in said electronic camera.

19. The pin protrusion measurement probe of claim 18, further comprising:
   a right angle optical prism that is held by said pin protrusion measurement probe housing and that reflects light from the fastener through said prism; and
   a lens that is held by said pin protrusion measurement probe housing, wherein said lens is disposed in line with said electronic camera and is pointed toward said prism, and said lens focuses light from said prism to form said image of the fastener in said electronic camera.

20. The pin protrusion measurement probe of claim 18, further comprising:
   a second electro-luminescent lighting panel, held by said pin protrusion measurement probe housing in said socket housing wherein said first electro-luminescent lighting panel has a first adjustable lighting intensity, said second electro-luminescent lighting panel has a second adjustable lighting intensity, and said first adjustable lighting intensity and second adjustable lighting intensity are individually adjustable to control forward and back lighting of the fastener.

21. The pin protrusion measurement probe of claim 18, wherein said socket housing has an angled offset from said longitudinal axis so that said pin protrusion measurement probe housing is asymmetrical.

22. The pin protrusion measurement probe of claim 18, wherein said socket housing has a viewing window.

23. A system for making a pin protrusion measurement of a fastener in a confined space within an aircraft, said system comprising:
   a pin protrusion measurement probe including:
      a pin protrusion measurement probe housing having a longitudinal axis and a socket housing with a parallel offset and an angled offset from said longitudinal axis;
      a probe socket attached to said pin protrusion measurement probe housing in said socket housing wherein said probe socket fits over a nut of the fastener, said probe socket establishes a stable position of said pin protrusion measurement probe housing relative to a bearing surface of the nut of the fastener when said socket is fitted over the nut, and said probe socket includes a viewing window;
      a first electro-luminescent lighting panel, held by said pin protrusion measurement probe housing in said socket housing wherein said first electro-luminescent lighting panel has a first adjustable lighting intensity;
      a second electro-luminescent lighting panel, held by said pin protrusion measurement probe housing in said socket housing wherein said second electro-luminescent lighting panel has a second adjustable lighting intensity, and aid first adjustable lighting intensity and second adjustable lighting intensity are individually adjustable to control a lighting of the fastener;
      a right angle optical prism that is held by said pin protrusion measurement probe housing and wherein light from the fastener passes through said viewing window and is reflected through said prism; and
      a lens that is held by said pin protrusion measurement probe housing, wherein said lens is pointed toward said prism, and said lens focuses light from said prism; and
      an electronic camera, held by said pin protrusion measurement probe housing, wherein light from the fastener passes through said viewing window, is reflected by said prism, is focused by said lens, and forms an image of the fastener in said electronic camera;
   a real-time display monitor connected by a signal connector cable to a signal output of said electronic camera, said real-time display monitor displaying said image of the fastener; and
   a computer, connected to said electronic camera, having vision system software that processes said image of the fastener, wherein said vision system software performs an edge search of said image of the fastener, locates a first edge position, locates a second edge position, and measures a pin protrusion of the fastener corresponding to a distance between said first edge position and said second edge position to make the pin protrusion measurement.

24. A system for making a pin protrusion measurement of a fastener in a confined space within an aircraft, said system comprising:
   means for placing an electronic camera at a stable position relative to the fastener;
   means for physically supporting and holding in a fixed position relative to each other said electronic camera and said means for placing said electronic camera at a stable position relative to the fastener;
   means for connecting said electronic camera to a computer having a computer vision system; and
   means for measuring the pin protrusion of the fastener using the computer vision system.

25. A method for measuring pin protrusion of a fastener, comprising steps of:
   providing a pin protrusion measurement probe having an electronic camera and a socket;
   connecting said pin protrusion measurement probe to a computer having a vision system;
   placing said pin protrusion measurement probe at a stable position relative to the fastener; and
   measuring the pin protrusion of the fastener using the computer vision system.

26. The method of claim 25 wherein said step of providing a pin protrusion measurement probe includes providing a probe with said socket having a parallel offset and an angled offset.

27. The method of claim 25 further comprising a step of: connecting said pin protrusion measurement probe to a real-time monitor.

28. The method of claim 25 further comprising a step of: controlling an adjustable lighting intensity of the fastener from a regulator module.

29. The method of claim 25 further comprising a step of: individually controlling, from a regulator module, a first adjustable lighting intensity of the fastener and a second adjustable lighting intensity of the fastener.

30. The method of claim 25 wherein said step of placing said pin protrusion measurement probe at a stable position relative to the fastener includes fitting said socket over a nut of the fastener.

31. The method of claim 25 wherein said step of measuring the pin protrusion includes steps of:

forming an image of the fastener from said electronic camera in said computer;

performing an edge detection search of said image of the fastener;

locating a first edge position in said image;

locating a second edge position in said image; and measuring the pin protrusion of the fastener corresponding to a distance between said first edge position and said second edge position.

* * * * *